(12) United States Patent
Fresco (10) Patent No.: US 11,029,533 B2
(45) Date of Patent: Jun. 8, 2021

(54) GLASSES WITH HINGE STRUCTURE WITH TEMPLE CLIP

(71) Applicant: Bernard B. Fresco, Toronto (CA)

(72) Inventor: Bernard B. Fresco, Toronto (CA)

( * ) Notice: Subject to any disclaimer, the term of this patent is extended or adjusted under 35 U.S.C. 154(b) by 0 days.

(21) Appl. No.: 16/329,445

(22) PCT Filed: Aug. 30, 2017

(86) PCT No.: PCT/CA2017/051024
§ 371 (c)(1),
(2) Date: Feb. 28, 2019

(87) PCT Pub. No.: WO2018/039796
PCT Pub. Date: Mar. 8, 2018

(65) Prior Publication Data
US 2019/0250426 A1     Aug. 15, 2019

Related U.S. Application Data

(60) Provisional application No. 62/381,050, filed on Aug. 30, 2016.

(51) Int. Cl.
*G02C 5/22*     (2006.01)
(52) U.S. Cl.
CPC .................................. *G02C 5/2209* (2013.01)
(58) Field of Classification Search
CPC .................................................... G02C 5/2209
(Continued)

(56) References Cited

U.S. PATENT DOCUMENTS 5,898,471 A * 4/1999 Simioni ............... G02C 5/2209
                                                              16/228
6,116,733 A * 9/2000 Krumme ............. G02C 5/2209
                                                              351/111

FOREIGN PATENT DOCUMENTS

CA        2566611 A1    11/2005
CA        2818708 A1     6/2012
WO    2010007692 A1     1/2010

OTHER PUBLICATIONS

International Search Report and Written Opinion for PCT/CA2017/051024 dated Nov. 28, 2017.

* cited by examiner

*Primary Examiner* — James C. Jones
(74) *Attorney, Agent, or Firm* — Millman IP Inc.

(57) ABSTRACT

In a first aspect, a pair of eyeglasses is provided and includes a lens and frame assembly that includes at least one lens, a first temple and a second temple, and a hinge structure pivotally connecting each temple to the lens and frame assembly. The hinge structure includes two first projections which are spaced apart from one another. Each first projection has a first pivot member thereon. The first projections extend from one of said temple and said lens and frame assembly. The other of said temple and said lens and frame assembly has two second pivot members that pivotally mate with the first pivot members. The first projections are resiliently flexible for movement between a use position in which the first pivot members are pivotally mated with the second pivot members, and a disengagement position in which the first pivot members are withdrawn from the second pivot members so as to permit the temple and the lens and frame assembly to be separated from one another. A blocking member is removably mountable in abutment with the first projections so as to prevent movement of the first projections to the disengagement position.

1 Claim, 7 Drawing Sheets

(58) Field of Classification Search
USPC .......................................................... 351/153
See application file for complete search history.

GLASSES WITH HINGE STRUCTURE WITH TEMPLE CLIP

FIELD OF INVENTION

This disclosure relates generally to the field of eyeglasses and more specifically to hinge structures for eyeglasses.

BACKGROUND OF INVENTION

It is known to make hinges for eyeglasses by forming an aperture at one end of each temple, and in corresponding projections on the frame. A small screw is passed through these apertures so as to pivotally connect the temples to the frame. There are several problems with this solution, however. Over time, it is common for the screw to loosen and eventually to fall out from the hinge thereby separating the frame from one of the temples. Furthermore, a specialized tool (i.e. a very small screwdriver) is typically needed to remove the screw if desired, or to tighten the screw if it should require it. Such a tool is not always readily available if needed. Furthermore, a threaded aperture is typically required for the screw to thread into, which can add to the complexity of forming the eyeglasses.

It would be beneficial to provide a hinge for eyeglasses that overcomes one or more of the above noted problems.

SUMMARY

In a first aspect, a pair of eyeglasses is provided and includes a lens and frame assembly that includes at least one lens, a first temple and a second temple, and a hinge structure pivotally connecting each temple to the lens and frame assembly. The hinge structure includes two first projections which are spaced apart from one another. Each first projection has a first pivot member thereon. The first projections extend from one of said temple and said lens and frame assembly. The other of said temple and said lens and frame assembly has two second pivot members that pivotally mate with the first pivot members. The first projections are resiliently flexible for movement between a use position in which the first pivot members are pivotally mated with the second pivot members, and a disengagement position in which the first pivot members are withdrawn from the second pivot members so as to permit the temple and the lens and frame assembly to be separated from one another. A blocking member is removably mountable in abutment with the first projections so as to prevent movement of the first projections to the disengagement position.

BRIEF DESCRIPTION OF THE DRAWINGS

The foregoing and other aspects of the disclosure will be more readily appreciated by reference to the accompanying drawings, wherein.

DETAILED DESCRIPTION OF ILLUSTRATED EMBODIMENTS

Figure 1:
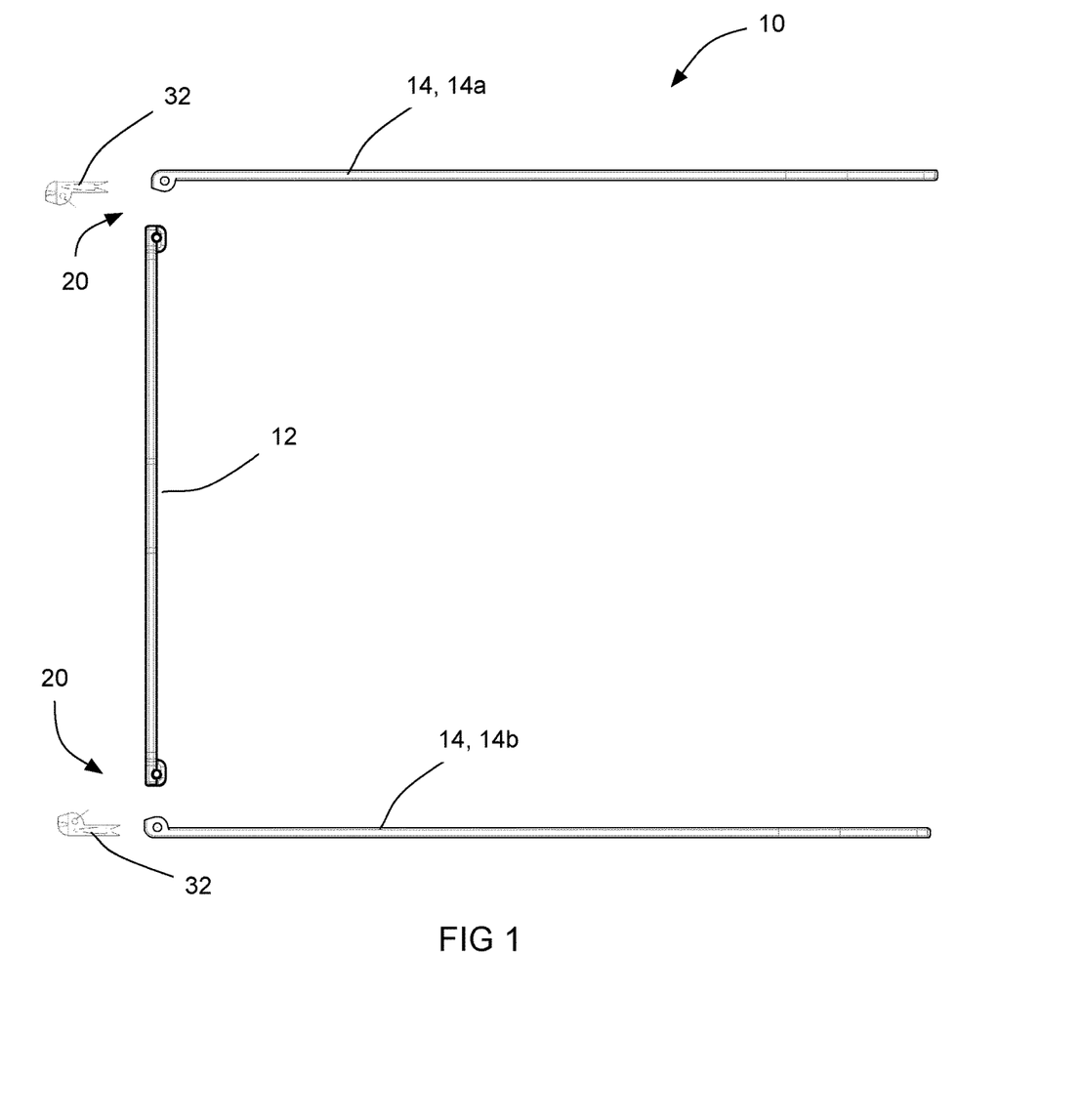
FIG. 1 is an exploded plan view of a pair of eyeglasses that incorporate hinge structures in accordance with an embodiment of the present invention.

Reference is made to FIG. 1, which shows an exploded view of a pair of eyeglasses 10 in accordance with an embodiment of the present invention. The eyeglasses 10 includes a lens and frame assembly 12, first and second temples 14 (shown individually at 14a and 14b), a first hinge structure 18 and a second hinge structure 20. The first and second hinge structures 18 and 20 pivotally connect the first and second temples 14 and 16 respectively to the lens and frame assembly 12.

Figure 2A:
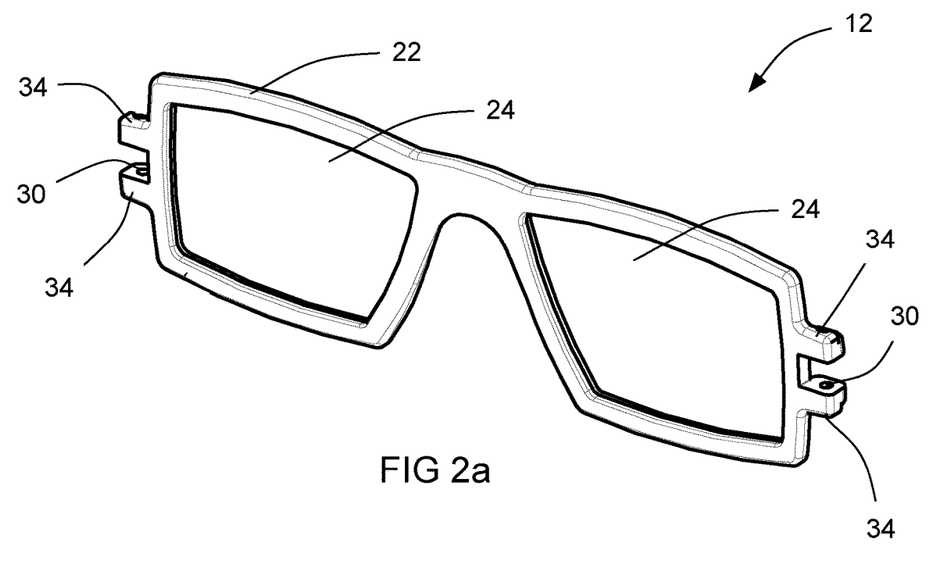
FIG. 2a is a perspective view of a frame from the eyeglasses shown in FIG. 1.
Figure 2B:
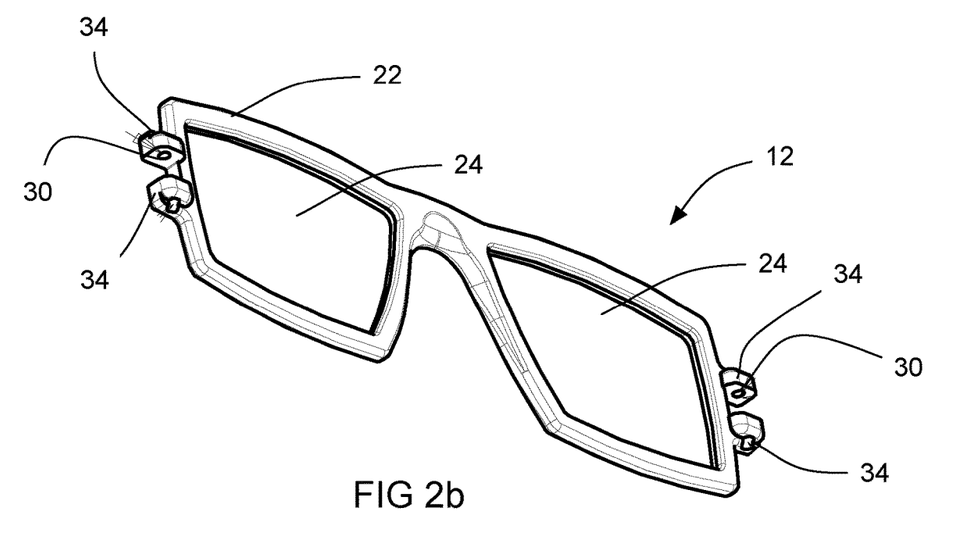
FIG. 2b is another perspective view of the frame shown in FIG. 2.

The lens and frame assembly 12 may be any suitable type of lens and frame assembly, and may, for example, include a frame 22 which is contiguous and fully surrounds one or more lenses 24 as shown in FIGS. 2a and 2b. The frame 22 may be made from any suitable material such as plastic and/or metal. The one or more lenses 24 may be made from one or more any suitable material such as plastic or glass material. Alternatively, in an embodiment that is not shown, a frame may be provided that only partially surrounds the one or more lenses. As another alternative that is not shown a frame may be provided that is made up of a plurality of separate components such as a nose piece that connects between two medial edges of the lenses, and a side frame portion that mounts to the lateral edge of each lens (i.e. where the lenses themselves act as structural elements between otherwise separate frame elements.

Figures 3, 4, 5:
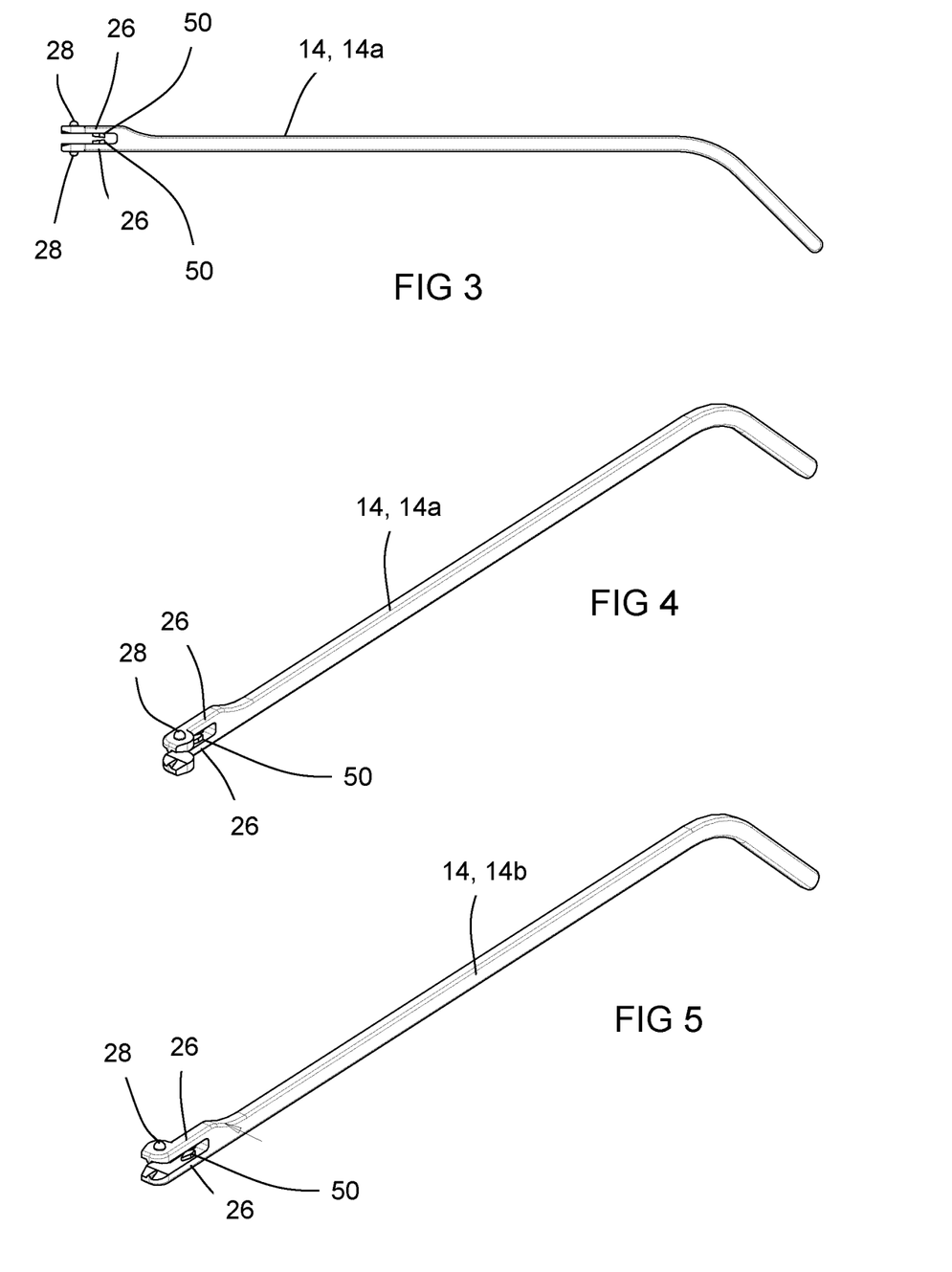
FIG. 3 is a side elevation view of a first temple that mounts to the frame shown in FIG. 1.
FIG. 4 is a perspective view of the first temple shown in FIG. 3.
FIG. 5 is a perspective view of a second temple that mounts to the frame shown in FIG. 1.

The temples 14, which are shown more clearly in FIGS. 3-5, may be any suitable types of temples and may be made from any suitable material such as plastic and/or metal.

Figure 6:
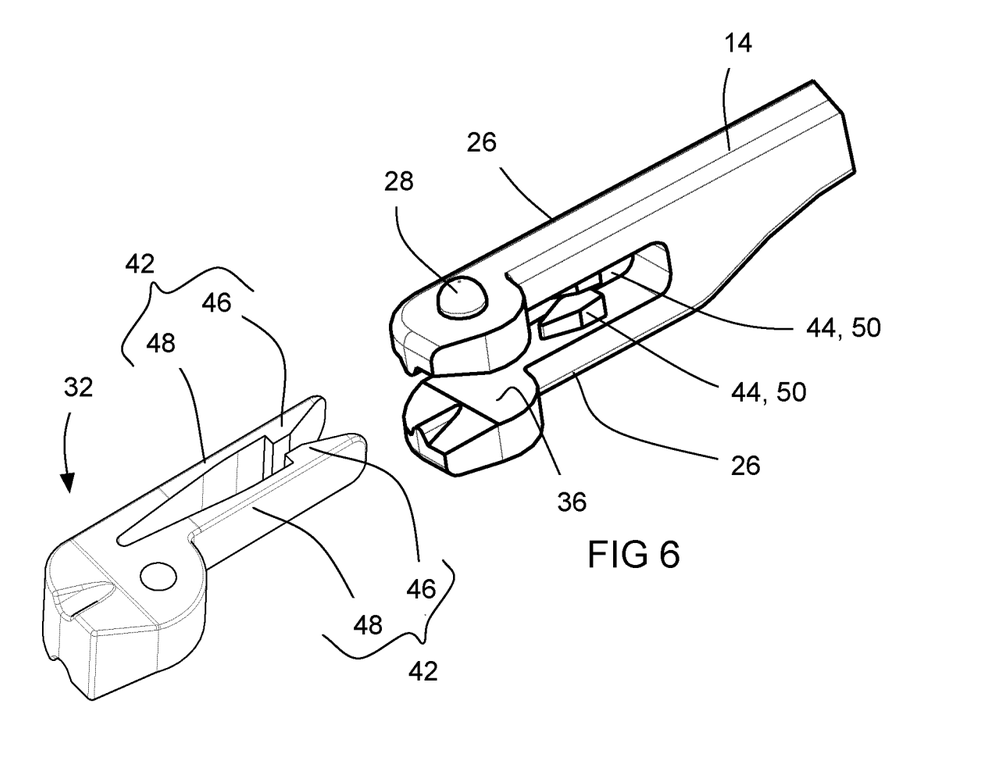
FIG. 6 is an exploded view of a temple clip that connects to each of the first and second temples to lock the temples to the frame.
Figure 7:
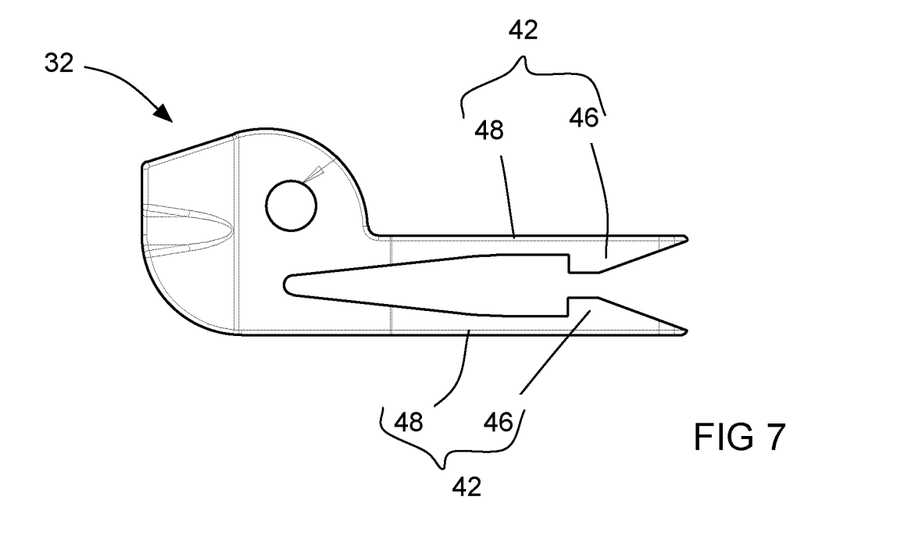
FIG. 7 is a side elevation view of the temple clip shown in FIG. 6.

The hinge structures 18 and 20 each include two first projections 26 which are spaced apart from one another as shown in FIG. 6. Each first projection 26 has a first pivot member 28 thereon (which in the embodiment shown, is a generally hemispherical boss). The first projections 26 may extend from either the temple 14 or the lens and frame assembly 12. In the embodiment shown they extend from the temple 14. The other of the temple 14 and the lens and frame assembly 12 (in the embodiment shown, it is the lens and frame assembly 12) has two second pivot members 30 (which, in the embodiment shown, are generally hemispherical depressions) that pivotally mate with the first pivot members 28, thereby providing a pivotal connection between the temple 14 and the lens and frame assembly 12.

The first projections 26 are resiliently flexible for movement between a use position in which the first pivot members 28 are pivotally mated with the second pivot members 30 (FIG. 8), and a disengagement position in which the first pivot members 28 are withdrawn from the second pivot members 30 so as to permit the temple 14 and the lens and frame assembly 12 to be separated from one another.

The hinge structures 18 and 20 each further include a blocking member 32 that is removably mountable in abutment with blocking member engagement surfaces 36 on the first projections 26 so as to prevent movement of the first projections 26 to the disengagement position.

Figure 8:
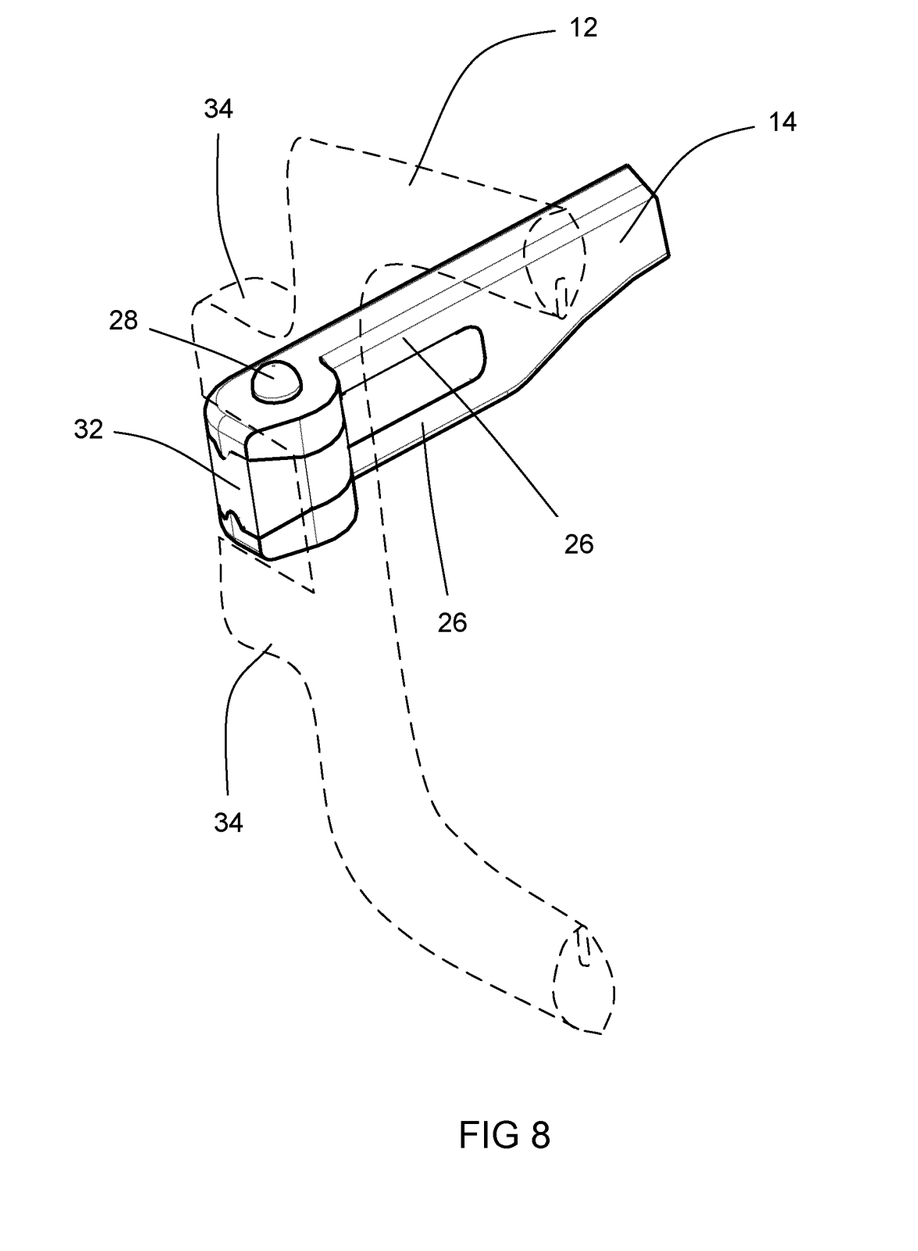
FIG. 8 is a perspective view of one side of the pair of eyeglasses showing the hinge structure fully assembled.
Figure 9:
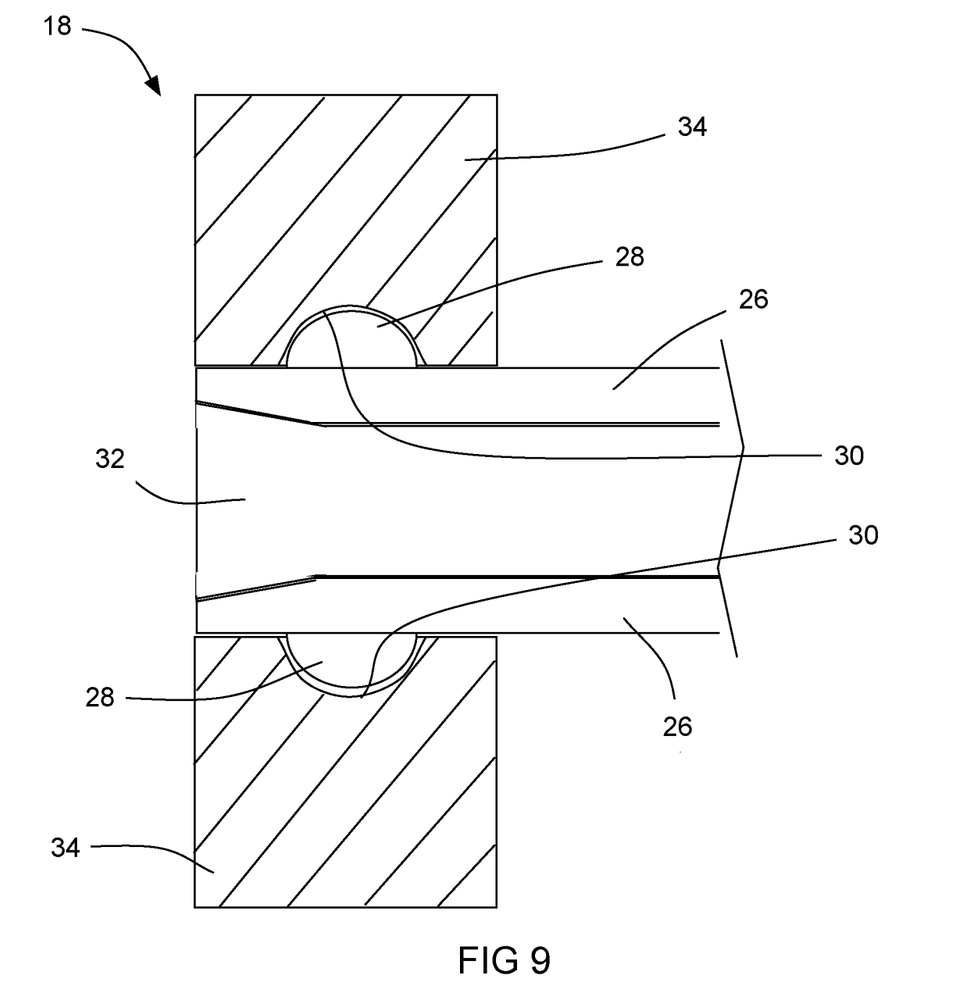
FIG. 9 is a sectional side elevation view of the hinge structure shown in FIG. 8.

In the embodiment shown in FIGS. 8 and 9 the first pivot members 26 face away from each other and the second pivot members 30 are positioned on a pair of second projections 34 that extend from the lens and frame assembly 12. Additionally, the blocking member 32 in FIGS. 8 and 9 is a member that fits between the two blocking member engagement surfaces 36 that face each other, where one surface 36 is on each of the second projections 34.

To assist in holding the blocking member 32 in position the blocking member 32 may include first locking elements 42 that engage locking elements 44 on the first projections 26. In the embodiment shown in FIG. 6 the blocking member 32 includes clip members 46 on resilient arms 48, which make up the first locking elements 42, and the first projections 26 include abutments 50 that make up the second locking elements 44.

In the embodiment shown in FIGS. 8 and 9, the first pivot members 28 are bosses and the second pivot members 30 are depressions that receive the bosses. However, it is alternatively possible for the first and second pivot members 28 and 30 to have other configurations that mate pivotally together. For example, the first pivot members 28 may be depressions and the second pivot members 30 may be bosses that are received in the depressions.

Figure 10:
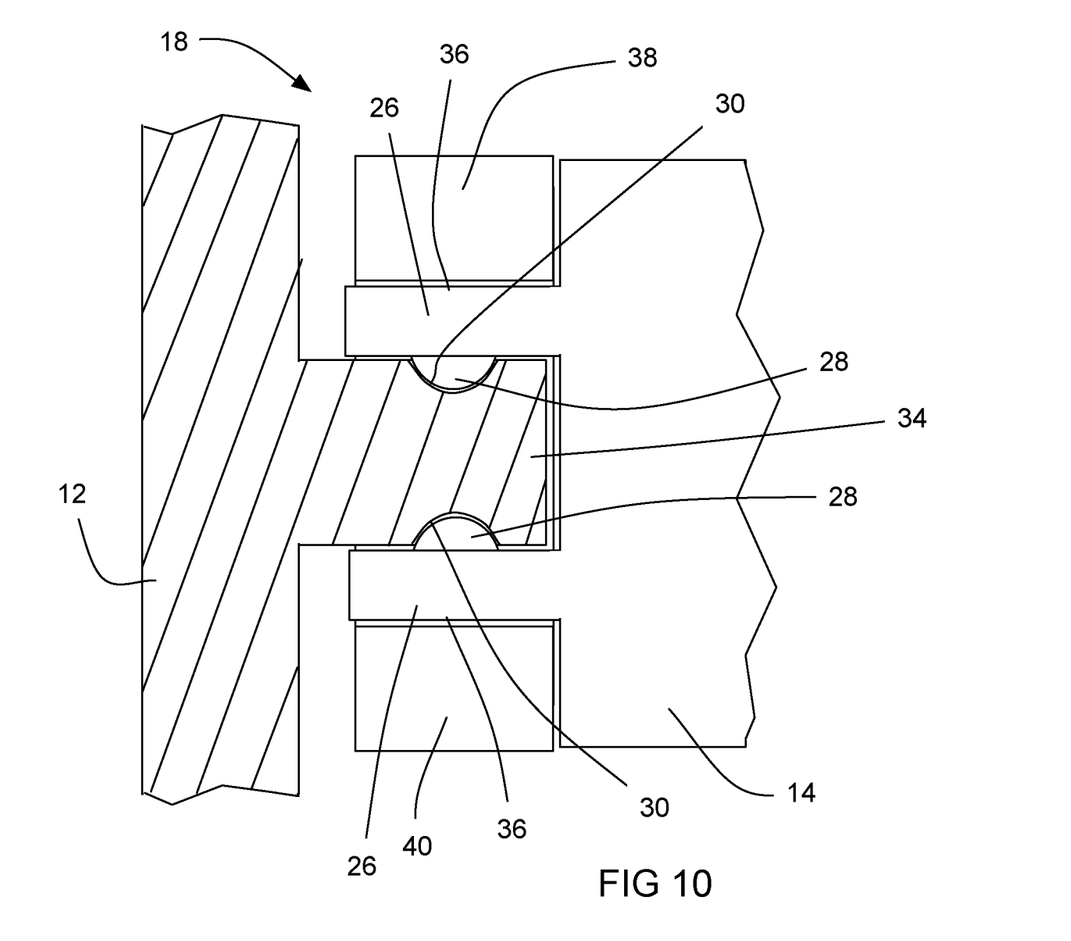
FIG. 10 is a sectional side elevation view of an alternative configuration of the hinge structure shown in FIG. 8.
Figure 11:
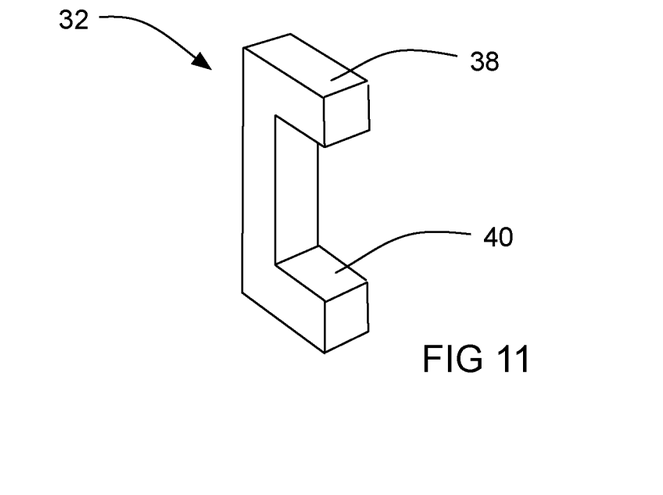
FIG. 11 is a perspective view of a blocking member from the hinge structure shown in FIG. 10.

In an alternative embodiment shown in FIG. 10, the first pivot members 28 may be positioned on the first projections 26 in such a way that the first pivot members 28 face each other and the second pivot members 30 may be positioned on a second projection 34 in such a way that they face away from each other. The blocking member 32 in FIG. 10 is a generally C-shaped member that fits over blocking member engagement surfaces 36 on the first projections 26, wherein the surfaces 36 face away from each other. Only upper and lower arms shown at 38 and 40 of the blocking member 32 are shown in FIG. 10, however, in FIG. 11 the C-shape can be seen more clearly.

In the embodiments shown in the figures, the first projections 26 with the first pivot members 28 thereon have been shown extending from the temple 14 and the second pivot members 30 have been shown as being mounted on the lens and frame assembly 12. It is alternatively possible, however, for the first projections 26 to extend from the lens and frame assembly 12.

Those skilled in the art will understand that a variety of modifications may be effected to the embodiments described herein without departing from the scope of the appended claims.

The invention claimed is:

1. A pair of eyeglasses, comprising:
   a lens and frame assembly that includes at least one lens;
   a first temple and a second temple; and
   a hinge structure pivotally connecting each temple to the lens and frame assembly, wherein the hinge structure includes:
   two first projections which are spaced apart from one another, each first projection having a first pivot member thereon, wherein the first projections extend from one of said temple and said lens and frame assembly, and wherein the other of said temple and said lens and frame assembly has two second pivot members that pivotally mate with the first pivot members, wherein the first projections are resiliently flexible for movement between a use position in which the first pivot members are pivotally mated with the second pivot members, and a disengagement position in which the first pivot members are withdrawn from the second pivot members so as to permit the temple and the lens and frame assembly to be separated from one another, and
   a blocking member that is removably mountable in abutment with the first projections so as to prevent movement of the first projections to the disengagement position,
   wherein the first projections have first sides that face each other, and second sides that face away from each other, wherein the first pivot members are on the second sides, and wherein the blocking member is mountable in abutment with the first sides.

* * * * *